United States Patent [19]

Oates et al.

[11] 3,819,407
[45] June 25, 1974

[54] HIGH TEMPERATURE RESISTANT LAMINATES

[75] Inventors: Alex N. Oates, Humble, Tex.; James T. Edmonds, Jr., Bartlesville, Okla.

[73] Assignee: Phillips Petroleum Company, Bartlesville, Okla.

[22] Filed: Mar. 9, 1972

[21] Appl. No.: 233,346

[52] U.S. Cl............ 117/138.8 N, 117/16, 117/21, 117/161 R, 117/161 UZ, 161/165, 161/252, 260/41 B
[51] Int. Cl............ B32b 27/08, C08j 1/40
[58] Field of Search..... 117/16, 21, 138.8 N, 161 R, 117/161 UZ, 260/41 B; 161/165, 189, 252

[56] References Cited
UNITED STATES PATENTS

| | | | |
|---|---|---|---|
| 2,538,941 | 1/1951 | Macallum | 260/79.1 |
| 2,825,706 | 3/1958 | Sanders | 117/132 |
| 2,893,906 | 7/1959 | Taylor | 117/132 |
| 2,961,341 | 11/1960 | Long | 117/75 |
| 2,976,257 | 3/1961 | Dawe et al. | 117/132 |
| 3,225,017 | 12/1965 | Seegman et al. | 117/132 |
| 3,294,568 | 12/1966 | Gossman | 117/132 |
| 3,318,714 | 5/1967 | Coney et al. | 117/132 |
| 3,354,129 | 11/1967 | Edmonds et al. | 260/37 |
| 3,395,132 | 7/1968 | Smith | 117/132 |
| 3,455,774 | 7/1969 | Lindsey et al. | 156/272 |
| 3,487,454 | 12/1969 | Oates et al. | 260/900 |
| 3,492,125 | 1/1970 | Ray | 117/161 R |
| 3,622,376 | 11/1971 | Tieszen | 117/161 R |
| 3,627,624 | 12/1971 | Kreuz | 117/138.8 N |

*Primary Examiner*—William D. Martin
*Assistant Examiner*—William R. Trenor

[57] ABSTRACT

High temperature and erosion resistant laminates comprising a polyimide layer or substrate or other high temperature resistant polymer coated with a poly(arylene sulfide) resin are provided.

4 Claims, No Drawings

HIGH TEMPERATURE RESISTANT LAMINATES

This invention relates to high temperature and erosion resistant laminates. In accordance with another aspect, this invention relates to the coating of high temperature resistant polymeric layers with a poly(arylene sulfide) resin. In accordance with a further aspect, this invention relates to laminates that are high temperature and erosion resistant comprising a polyimide substrate coated with a poly(arylene sulfide) resin. In accordance with a further aspect, this invention relates to a method for coating high temperature resistant polymers with a poly(arylene sulfide) resin coating.

Structural plastics such as polyimides are subject to erosion and hydrolytic degeneration. Various expedients have been advanced in the art to overcome these problems. In accordance with the invention, it has been discovered that structural plastics such as the polyimides, which are subject to erosion and hydrolytic degeneration, can be coated with a poly(arylene sulfide) resin, yielding a high temperature and erosion resistant product.

Accordingly, an object of this invention is to provide high temperature and erosion resistant laminates.

Another object of this invention is to provide a method for coating high temperature resistant polymers which are subject to erosion and hydrolytic degeneration.

Another object of this invention is to provide hard and moisture-insensitive plastic coating compositions.

Other objects, advantages and features of the invention will be apparent to those skilled in the art from consideration of the following disclosure and the appended claims.

In accordance with the invention, polymeric substrates such as polyimides, which are subject to erosion and hydrolytic degeneration, are coated with poly(arylene sulfide) resins, yielding high temperature and erosion resistant laminates.

In accordance with one embodiment of the invention, polyimide substrates are coated with poly(biphenylene sulfide) resins to yield laminates that are high temperature and erosion resistant.

In accordance with a preferred embodiment, a heat stable polymer such as a polyimide is coated with poly(biphenylene sulfide) resin or with a blend of this resin with other poly(biphenylene sulfide) polymers or copolymers which permit a lower working temperature. The poly(biphenylene sulfide) can be applied as a slurry coating or dry powder, followed by the relatively short heating at an elevated temperature to melt and cure the poly(biphenylene sulfide) coating. The resulting laminate has high temperature stability and is protected against water and air erosion.

The term "arylene sulfide polymer" as used in this specification is intended to include polymers of the type which are prepared as described in U.S. Pat. No. 3,354,129, issued Nov. 21, 1967, to Edmonds and Hill. As disclosed in that patent, these polymers can be prepared by reacting a poly-halo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedure of this invention, because of their high thermal stability and availability of the materials from which they are prepared, are those polymers having the repeating unit —R—S— where R is biphenylene, naphthylene, biphenylene ether, or a lower alkyl-substituted derivative thereof. By "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers which are used for coatings in this invention are preferably those which have melting temperatures above about 400°F. These arylene sulfide polymers can have a melting temperature anywhere in the range from 400° to 900°F. Polymers and copolymers of biphenylene sulfide normally have melting temperatures in the range from about 550° to 900°F. The preferred polymers, especially poly(biphenylene sulfide), have a melting point of about 830°F and a curing time of about 10 minutes at 900°F. Such polymers have been found to form very adherent, uniform coatings which are superior for the uses mentioned above. Mixtures of poly(arylene sulfide) polymers having these properties may also be used.

As indicated above, the substrates of the laminates according to the invention are resins or plastics which have high temperature stability, but which are subject to wind and water (hydrolytic) erosion. Some of these materials are porous structures. The polyimides that can be employed as substrates according to the invention are well known to the art as illustrated by U.S. Pat. No. 2,710,853; 2,900,369; and 2,731,447.

The polyimides utilized as substrates according to the invention can contain fillers such as glass, asbestos, metal oxide powders, etc., which are heat stable.

The poly(arylene sulfide) resins likewise can contain various known ingredients including fillers such as titanium dioxide, iron oxide, asbestos fibers, etc., in the range of 2–100 percent by weight based on the weight of polymer.

The poly(arylene sulfide) resin can be applied to the substrate either as a slurry, as dry powder, or by fluidized bed technique. Volatilizable liquids that can be used in formation of the slurries are substantially non-reactive with the other materials of the composition and which are volatilizable preferably at ambient conditions. Examples of suitable liquids are water, ethanol, methanol, 2-propanol, hexane, ethylene glycol, acetone, xylene, tetrahydrofuran, tetrahydropyran, 4-chlorotetrahydropyran, and the like, as well as mixtures thereof.

It is often preferred to apply the poly(arylene sulfide) resin to the substrate as a powder. However, if a liquid is used for formation of a slurry, the slurry is preferably allowed to dry by evaporation of the liquid prior to subjection of the cement and polymer to substantial elevated temperatures. The drying can be facilitated by reduced pressure if desired.

After application of the poly(arylene sulfide) resin to the polyimide substrate, the poly(arylene sulfide) resin coated substrate is subjected to heat to effect cure since curing toughens the poly(arylene sulfide) polymer. The curing is carried out by heating the polymer together with the polyimide substrate above the melting point of the poly(arylene sulfide) resin for a period of time sufficient to improve its properties. Generally, this is done at 700° to 900°F for about 1 to about 20 minutes.

The resulting laminates or articles formed according to the invention are particularly valuable as structural elements in high speed aircraft, rockets, space vehicles, heat barriers, and the like.

SPECIFIC EXAMPLE

Preparation of Poly(biphenylene sulfide)

A poly(biphenylene sulfide) resin was prepared by introducing 404 grams sodium sulfide flake and 2.5 liters of N-methylpyrrolidone into a 2-gallon autoclave reactor. The reactor was purged with nitrogen and heated to 400°F followed by addition of 682 grams of 4,4'-dichlorobiphenyl(M.P. 145°–147°C) in 1000 cc (1 liter) N-methylpyrrolidone, which had been preheated to about 300°F before being added to the reactor. The temperature of the reactor contents was raised to 500°F and held there for 4 hours. The reactor was quenched with water, and the resulting yellow liquid was washed with deionized water four times and filtered each time. The polymeric product was dried at 200°F for 16 hours. The yield of polymer was 515 g.

The effectiveness of the polymer prepared above as a coating for a polyimide polymer was evaluated along with an uncoated polyimide as a control. In this evaluation, 7 × 3 × ⅛ slabs of a heat stable polyimide commercially available were used. One of the slab samples was spray coated with a blend of 75 grams poly(biphenylene sulfide) prepared above, 25 grams $TiO_2$, 250 ml water, and 2 grams Triton X-100 (Rohm and Haas) surfactant, which mixture was blended in a Waring blender. The slab, coated on one side only, was cured at 900°F for 10 minutes. A good smooth coating was obtained.

Tests were made to determine if the properties of the polyimide had been changed by the 900°F cure.

|  | Control | Coated Sample |
|---|---|---|
| Flex. mod. $10^{-3}$ | 2710 | 2870 |
| Tensile break, psi | 14,200 | 13,530 |
| Elongation, % | 2 | 2 |

No change was observed and the coating effectively sealed the polyimide surface making it suitable as a structural laminate in aircraft construction.

We claim:

1. A high temperature and erosion resistant coated article consisting essentially of a polyimide substrate having a coating of a poly(arylene sulfide) resin.

2. An article according to claim 1 wherein said poly(arylene sulfide) resin is poly(biphenylene sulfide).

3. An article according to claim 1 wherein said polyamide substrate additionally contains a filler.

4. An article according to claim 1 wherein said poly(arylene sulfide) additionally contains a filler.

* * * * *